Sept. 3, 1968  D. G. JONES ET AL  3,399,442
CUTTING INSERT
Filed Sept. 8, 1966  3 Sheets-Sheet 1
FIG-1
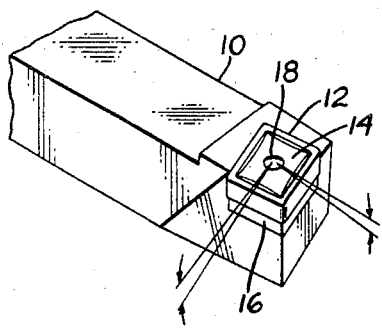
FIG-2
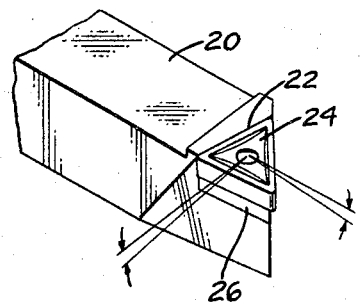
FIG-3
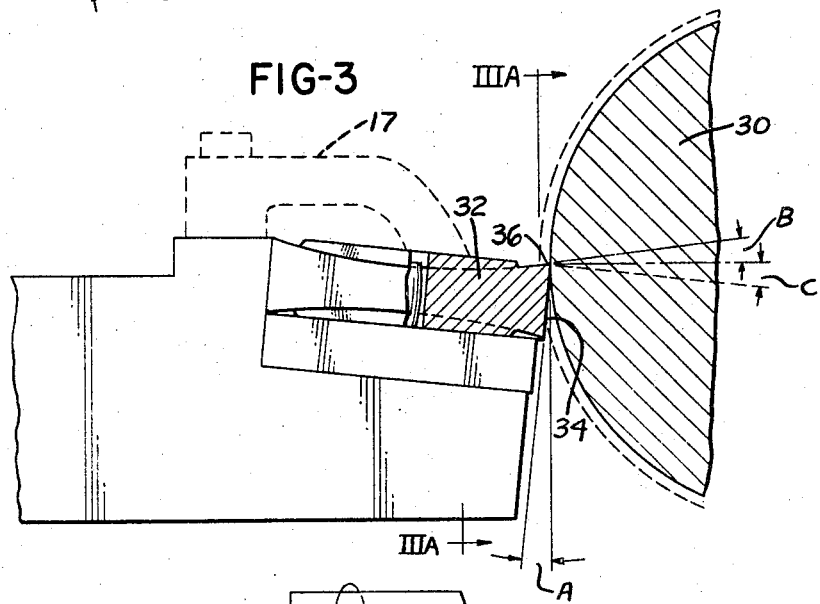
FIG-3A
INVENTORS
DENNIS G. JONES
GEORGE E. GREUBEL
BY Sept. 3, 1968  D. G. JONES ET AL  3,399,442
CUTTING INSERT
Filed Sept. 8, 1966  3 Sheets-Sheet 2

INVENTORS
DENNIS G. JONES
GEORGE E. GREUBEL
BY
Melvin H. Cushy

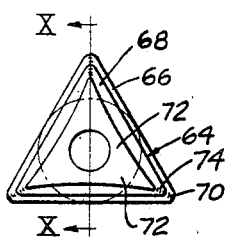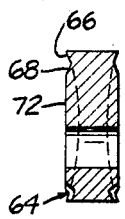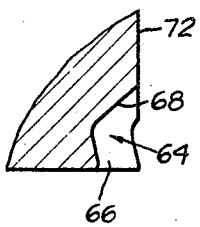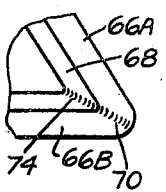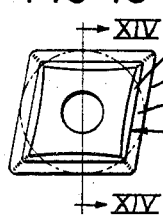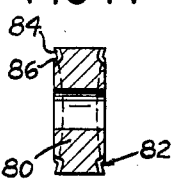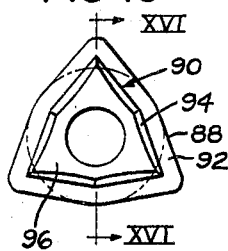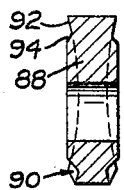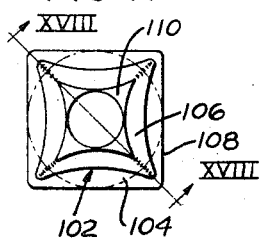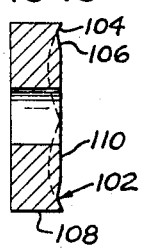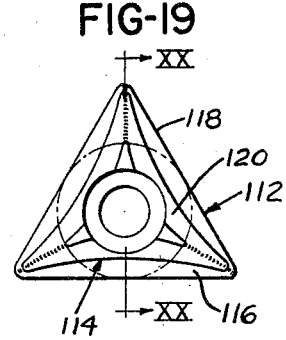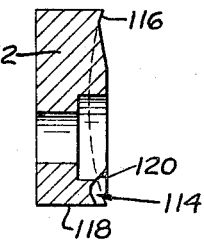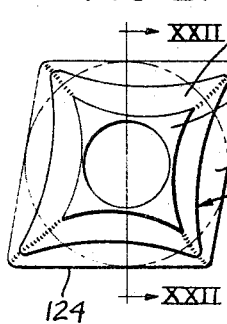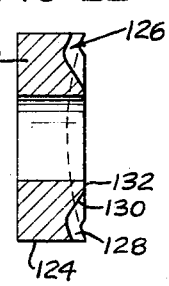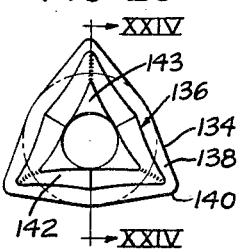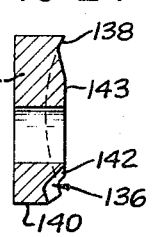

United States Patent Office 3,399,442
Patented Sept. 3, 1968

3,399,442
CUTTING INSERT
Dennis G. Jones, Greensburg, and George E. Greubel,
Latrobe, Pa., assignors to Kennametal Inc., Latrobe, Pa.
Filed Sept. 8, 1966, Ser. No. 577,901
14 Claims. (Cl. 29—95)

This invention relates to cutting inserts and, in particular, to positive rake indexible cutting inserts of the throw-away type.

Cutting inserts of the general nature with which the present invention is concerned are generally made of an extremely hard material, such as sintered tungsten carbide or the like, which commonly is machinable only with great difficulty, such as by grinding with a diamond or a silicon carbide wheel or the like. For the reason that the inserts referred to can be machined only with great difficulty, when the inserts were first introduced into commerce, they were in the form of simple prisms, generally having right angled corners forming the cutting edges of the inserts. With such an insert, when it is tilted in order to obtain a clearance angle between the periphery of the insert and the work being machined, the rake angles between the workpiece and the face of the insert forming the cutting side become negative. In most cases where cutting inserts aer employed, positive rake angles are preferred. Because of the aforementioned manner in which cutting inserts were introduced into commerce, however, it has developed that most of the existing holders for cutting inserts are of such a nature that the inserts present negative rake angles to the workpiece. In some instances, of course, negative rake angles may be preferred while in other and probably most instances, positive rake angles are to be preferred. At the present time, in order to take advantage of both positive and negative rake cutting inserts, a different holder is required for each type of insert.

With the foregoing in mind, it is a primary objective of the present invention to provide a cutting insert which is adapted for mounting in a substantially conventional negative rake holder but which insert will present positive rake angles to the surface being cut thereby.

The forming of inserts of the nature referred to is difficult and tolerances must be held within relatively close limits and the inserts must all be relatively uniform with respect to dimensions and performances so as to be readily replaceable at any time.

The present invention thus has as a further objective, the provision of a positive rake insert especially adapted for mounting in a negative rake holder and of such a nature that the inserts can readily be manufactured so as to hold close tolerances and thus to be readily indexible and insertable and replaceable by each other.

In respect to the manufacturing of positive rake inserts according to the present invention, it will be understood that inserts having positive back rake are known which can be mounted in negative rake holders. Back rake, as the term is used in the trade, is the angle between the cutting edge of the tool and a perpendicular to the surface being cut thereby. When this angle lies on the side of the perpendicular toward which the workpiece surface is moving, the rake angle is positive; and when it is on the other side of the perpendicular the rake angle is negative.

Known inserts having a peripheral wall perpendicular to the top and bottom faces obtain a positive back rake angle by forming a groove in the face of the insert which meets the peripheral wall of the insert at some angle greater than the clearance angle of the peripheral wall from the workpiece.

Another important rake angle is that refererd to as "side rake" and which is the angle between the surface of the insert that receives the chip from the workpiece and the direction of feed of the insert across the workpiece. The aforementioned known positive rake insert does not have positive side rake because the cutting edge and the adjacent chip controlling groove are parallel to the cutting edge face of the insert and, thus, when the insert is tilted to provide side clearance between the side of the insert and the shoulder as the workpiece at the side of the insert, the cutting edge and groove are also tilted upwardly and a negative side rake angle results.

Other inserts are known which exhibit positive side rake as well as positive back rake but these known inserts have the peripheral wall tapering to obtain the front and side clearance. Such inserts are expensive to make and are not invertible and, due to the shape thereof, are difficult to hold to close tolerances.

Neither of the known positive rake inserts exhibit any variable chip control to adapt the insert to various cutting conditions which are encountered upon changing the feed rate or depth of cut or the surface speed of the workpiece.

In the using of cutting inserts, the feed rate will vary substantially from one work situation to another and, with the usual insert which is formed with a uniform chipcontrolling groove, the insert presents no means for atlering the conditions for turning or breaking the chip. This, of course, works to the disadvantage of the cutting condition so that satisfatcory chips are not always produced at various feed rates with cutting inserts having uniform chipcontrolling grooves formed therein.

It is, accordingly, a further object of the present invention to provide an insert of the nature referred to, namely, a positive rake insert especially adapted for mounting in a negative rake holder, in which the chipcontrolling conditions created by the chipcontrolling groove of the insert varies in conformity with variations in the condition under which the cut is taken by the insert.

A still further object of this invention is the provision of an insert of such configuration that improved operating characteristics are had while at the same time, the forming molds or dies for the inserts can be readily formed to a high degree of accuracy by observing substantially conventional machining practices.

The foregoing objects of the present invention as well as still other objects and advantages thereof will become more apparent upon reference to the following detailed specification taken in connection with the accompanying drawings in which:

FIGURE 1 is a perspective view showing a negative rake holder for a rectangular insert with an insert according to the present invention mounted therein;

FIGURE 2 is a view similar to FIGURE 1 but shows a holder for a triangular insert;

FIGURE 3 is a view looking in at the side of a cutting insert and a holder therefor and the workpiece being machined thereby showing how a clearance angle is maintained at the periphery of the cutting insert while a positive back rake angle is presented to the workpiece;

FIGURE 3A is a view looking toward the workpiece and showing how the insert presents a positive side rake. FIGURE 3A is indicated by line III–A—III–A on FIGURE 3.

FIGURE 9 is a plan view looking down top of a triangular insert;

FIGURE 10 is a sectional view indicated by line X—X on FIGURE 9;

FIGURE 11 is a fragmentary sectional view drawn at greatly enlarged scale and showing the cutting edge of the triangular insert midway between the corners of the insert;

FIGURE 12 is a view looking at the corner of the insert on FIGURE 9 and drawn at an enlarged scale showing how the chipcontrolling groove extending along one side of the insert is blended with the groove extending along the edge of the adjacent side;

FIGURE 13 is a plan view showing an insert in the form of an equilateral parallelogram or rhombus;

FIGURE 14 is a section indicated by the line XIV—XIV on FIGURE 13;

FIGURE 15 is a plan view of a modified triangular insert referred to in the trade as a trigon;

FIGURE 16 is a sectional view indicated by line XVI—XVI on FIGURE 15;

FIGURE 17 is a plan view of another form of rectangular insert which is one sided;

FIGURE 18 is a sectional view indicated by line XVIII—XVIII on FIGURE 17;

FIGURE 19 is a plan view of another type of triangular insert which is one sided;

FIGURE 20 is a sectional view indicated by line XX—XX on FIGURE 19;

FIGURE 21 is a plan view of another rhombus shaped insert which is one sided;

FIGURE 22 is a section indicated by line XXII—XXII on FIGURE 21;

FIGURE 23 is a plan view of another type of modified triangular insert which is one sided;

FIGURE 24 is a vertical section indicated by line XXIV—XXIV on FIGURE 23;

Figure 4:
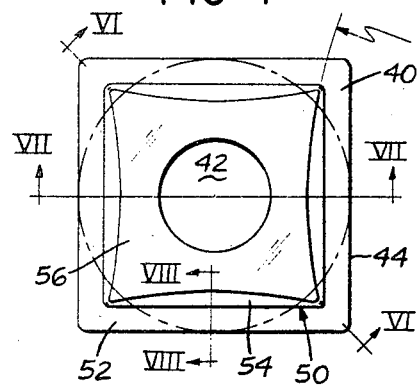
FIGURE 4 is a plan view looking down at one face of a rectangular insert.

Referring to the drawings somewhat more in detail, in FIGURE 1 the tool holder is indicated by reference numeral 10. The tool holder is formed with a pocket 12 in one end thereof which is adapted for receiving therein a cutting insert 14 which rests on a hard shim or anvil 16 also disposed within the pocket. The insert and anvil may be clamped in position in a suitable manner, such as by a top clamp, or the insert and anvil may be provided with a central hole in which a locking pin or lever extends. In FIGURE 1 the hole in the insert is indicated at 18 and the holder carries a pin or lever or locking device that extends into the hole and which, when adjusted, forces the insert back against the vertical back walls of the pocket and grips the insert in place in the holder. A typical top clamp is shown in dotted outline at 17 in FIGURE 3.

In FIGURE 2, holder 20 has a pocket 22 at the front which may have a single back wall. Pocket 22 is adapted for receiving triangular insert 24 which rests on a shim or anvil 26. Triangular insert 24 is adapted for being clamped in the holder in somewhat the same manner as has been described in connection with the insert of FIGURE 1, allowance being made for the single wall pocket.

As will be seen in FIGURES 1 and 2, the plane of the upper face of each of the inserts shown therein is tilted somewhat downwardly in two directions with respect to a horizontal plane by an amount which is shown as being about 5° although it will be understood that this angle could vary substantially. The tilting of the insert provides clearance between the periphery of the insert and the workpiece on two sides of the insert so the cutting edge of the insert makes proper cutting engagement with the workpiece.

The holders 10 and 20 shown in FIGURES 1 and 2 are what are referred to as negative rake holders. These holders are referred to as negative rake holders because if the inserts placed therein are simple prisms having parallel top and bottom faces extending at right angles to the peripheral surfaces of the inserts, the inserts must then be tilted downwardly toward the workpiece in order to provide clearance between the peripheral surfaces thereof and the workpieces so that the cutting edges of the inserts can engage the workpiece surfaces in the proper manner. The cutting edge of such an insert is formed at the juncture of the peripheral wall of the insert with one or both of the parallel top and bottom faces of the insert. When the entire top and bottom faces of the insert are parallel and extend at right angles to the peripheral surface of the insert, the supporting of the insert so as to provide a clearance angle between the peripheral wall of the insert and the surface of the workpiece will result in the cutting edge of the insert being presented to the work at negative rake angles. Even when a chipcontrolling groove according to usual practice is provided in the face of the insert, the insert has negative rake angles.

The insert is also tilted downwardly not only toward the workpiece but also in the feed direction to provide both front and side clearances for the insert and this results in both the back and side rake angles being negative.

The insert of the present invention is so formed that the rake angles measured in the feed direction, and in a direction normal thereto, namely, the side rake angle and the back rake angle, are both positive. This desirable feature is arrived at by making the recess which extends about the face of the insert concave toward the respective face, preferably by curving the outer region of the recess, either spherically or cylindrically.

When the outer region of the recess has a long radius of curvature, the groove is shallow and the island area in the center of the insert is large enough to provide adequate support for the insert on a flat anvil when it is under load and the insert can readily be made two sided with cutting edges on both top and bottom faces.

On the other hand, when a short radius of curvature is used, the groove is deep and the island area becomes necessarily small and the insert does not have adequate support as a flat anvil and the insert is usually made one sided with cutting edge on only one face. Such an insert can be made two sided, of course, by providing a shaped support anvil to engage the bottom surface of the insert.

The large radii of curvature result in the smaller positive rake angles while the short radii of curvature result in the larger positive rake angles.

As will be seen in FIGURE 3, workpiece 30 is being turned by cutting insert 32 according to the present invention. The peripheral surface 34 of the insert has a front clearance angle A from the surface of the workpiece being cut. This angle A may be from 5 to 10 degrees depending upon the particular material and the depth of cut being taken and other factors. The cutting edge of the insert, which is defined by the juncture of the peripheral wall with the upper end face of the insert, is designated 36 in FIGURE 3.

The insert has a peripheral groove in the upper face extending completely thereabout and from the cutting edge 36 inwardly toward the center of the insert. The provision of this recess causes the insert to present a back rake angle B to the workpiece which, as will be seen in FIGURE 3, is positive. This angle may vary from 5 to 10 degrees, or more, depending, as before, upon the particular material being cut and other factors encountered in machining procedures. FIGURE 3 also shows, by means of the dashed line forming an extension of the upper face of the insert, that the mounting of the conventional type insert having right angled cutting edges in the holder will produce a negative back rake angle as indicated at C. It will be appreciated that this back rake angle is substantially identical with clearance angle A and it is usually on the order of about seven degrees. The holder holds the insert tilted at a similar angle in the direction of feed to provide side clearance as will be seen in FIGURE 3A. In FIGURE 3A, the side clearance is indicated by angle D while the side rake angle is indicated by angle E. FIGURE 3A shows how the side rake angle varies as the feed rate varies and a thicker chip, as measured in the feed direction, is taken.

From the foregoing will be seen that one and the same holder is adapted for receiving conventional negative rake inserts and also for receiving positive rake inserts constructed in accordance with the present invention. The provision of positive rake inserts according to the present invention permits the machine operators to take advantage of the preferred positive rake conditions for most machining operations while using their existing negative rake holders. The holders for the cutting inserts are quite expensive and have long life so that it will be evident that the provision of positive rake inserts of the nature described herein represents a substantial economic advantage to the machine operators that already own holders for negative rake inserts.

The particular nature of inserts constructed according to the present invention will be more readily apparent upon reference to the other figures of the drawings.

A rectangular insert, according to the present invention, is illustrated in some detail in FIGURES 4 through 8. In FIGURE 4 the insert 40 comprises a body, of cemented tungsten carbide, for example, which may have a central clamping hole 42. The insert has a peripheral wall 44 and top and bottom faces 46 and 48, respectively, which are parallel with each other and perpendicular to peripheral wall 44. Each face of the insert is provided with a peripheral groove 50 which will be seen, extends completely about the insert and also extends from the extreme periphery of the insert toward the center thereof. The recess is made up of an outer part or region 52 and an inner part or region 54. Inwardly from the inner edge of inner part or region 54, the insert has an island area 56 which forms that surface of the insert that rests on the supporting shim or anvil when the opposite face of the insert is at the side at which cutting takes place. In this specification, the "top" of the insert is that side at which cutting takes place while the "bottom" of the insert is that side that rests on the shim or anvil regardless of the actual spatial position of the insert.

According to the present invention, the outer part or region 52 of the insert is concave toward the pertaining face of the insert. In FIGURES 4 to 8 the outer part 52 of the recess is spherically formed whereas the inner region 54 of the recess forms a relatively abrupt rise extending from the bottom of region 52 to the plane of the pertaining face of the insert.

Figure 5:
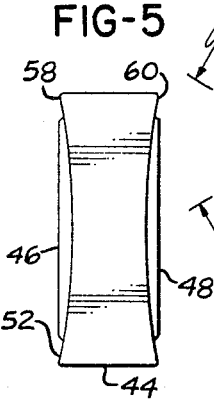
FIGURE 5 is a side elevational view of the insert of FIGURE 4.
Figure 6:
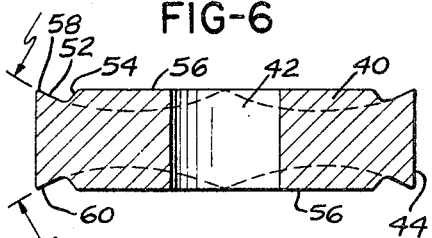
FIGURE 6 is a sectional view indicated by line VI—VI on FIGURE 4.
Figure 7:
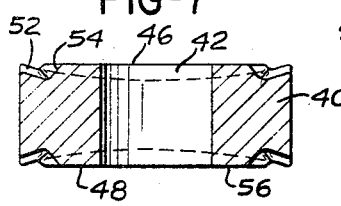
FIGURE 7 is a sectional view indicated by line VII—VII on FIGURE 4.

The outer region 52 of the recess 50 of the insert of FIGURES 4 to 8 is a portion of a single sphere having its center disposed on a perpendicular erected from the center of the pertaining face of the insert as will be seen in FIGURES 5 and 6. The forming of the outer region 52 of the recess to a shperical configuration results in substantial curving of the cutting edges 58 and 60 of the insert from corner to corner of the insert when viewed from the side of recess as will be seen in FIGURES 5, 6 and 7. The radius of the sphere is so selected and the center thereof is so located that the extreme corners of the cutting edges are in the same plane as the central island area 56 of the face pertaining to the respective cutting edges. whereas those portions of the cutting edges between the said corners, are arcuate and lie on the same side of the pertaining face of the insert as will be clearly seen in FIGURES 5, 6, and 7.

Figure 8:
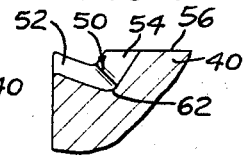
FIGURE 8 is a fragmentary sectional view drawn at somewhat enlarged scale and indicated by line VIII—VIII on FIGURE 4.

FIGURE 8 shows at enlarged scale the configuration of recess 50 in cross section. It will be observed in FIGURE 8 that the outer region 52 is curved in both directions whereas the inner region 54 of the recess forms a relatively abrupt rise, which may be linear in cross section, and defines the outer limits of the island area 56. As will be seen in FIGURE 4, the inner region 54 of the recess is formed so as to be convex toward the center of the insert. The inner region 54 can be linear in cross section or it can be curved but, in any event, when the insert is viewed in plan, as in FIGURE 4, the inner region 54 of the insert is convex toward the center of the insert. Recess 50 is thus narrowest and shallowest at the corners of the insert and gradually increases in width and depth from each corner toward a point midway between adjacent corners.

The outer and inner regions 52 and 54 of recess 50 are preferably smoothly blended together by a region 62 of relatively small radius.

FIGURES 9 through 12 show a triangular insert which is constructed substantially in the same manner as the insert of FIGURES 4 through 8 except that, in FIGURES 9 through 12, the peripheral groove 64 which, as before, is made up of an outer region 66 and an inner region 68, is not exactly the same shape as the recess 50 described in connection with FIGURES 4 through 8.

In FIGURES 9 through 12 the outer region 66 of peripheral recess 64, instead of being a portion of a single continuous spherical surface, is made up of a plurality of cylindrical surfaces. The cylindrical portion of the recess adacent each straight cutting edge is a portion of a cylinder having its axis in a plane perpendicular to and bisecting the respective cutting edge and with the said axis being inclined downwardly toward the center of the insert. Thus, the three outer regions of recess 64 of the insert of FIGURES 9 through 12 are portions of three cylinders, all of the same size but having different axes. The outer region of the recess is, as before, concave toward the pertaining face of the insert in respect to all parts thereof but is made up of portions of three equal but separate cylindrical surfaces.

As will be seen in FIGURE 12, two adjoining such cylindrical surfaces at 66A and 66B are blended at 70 with a suitable radius to provide a smooth transition from one cylindrical surface to the other while the adjacent surface 68A and 68B of the inner region of the recess are blended together with a small radius at 74.

As in connection with the insert of FIGURES 4 through 8, the inner region 68 of the recess is in the form of a relatively abrupt rise and defines the outer limit of the central island area 72. The inner region 68 of the recess is made up of three portions joining at the corners of the insert, all blended together with a small radii as indicated at 74 in FIGURE 12.

The insert of FIGURES 9 through 12, similar to the insert FIGURES 4 through 8, is two sided, which is to say, the insert has identical recesses and island areas on both sides so that the insert can not only be indexed to present its respective cutting edges to the workpiece on one side of the insert, but it can also be inverted so that the cutting edges on the other side can also be utilized. In either inverted position of the insert, a substantial island area is presented to the supporting shim or anvil so that the insert is adequately supported at all times and can sustain the high loads encountered during cutting operations.

In FIGURES 13 and 14 there is shown as insert 80 which is in the form of a rhombus. The insert is provided with a peripheral recess 82 which has a concave outer region 84 and an abruptly rising inner region 86 along each edge of the insert. The regions 84 and 86 along each edge are joined at the corners of the insert similarly to the corresponding regions in the triangular insert of FIGURES 9 through 12. Also, as in connection with the modification of FIGURES 9 through 12, the outer region of the recess is made up of cylindrical surfaces with the axis of each cylinder being located substantially in a plane perpendicular to and bisecting the respective cutting edge of the insert with said axis inclining downwardly toward the center of the insert. As before, the cylindrical surfaces are blended by small radii at the region where the surfaces meet.

FIGURES 15 and 16 show an insert known as a trigon in which the body 88 is somewhat modified from a triangular shape. The insert has a peripheral recess 90 extending completely around the insert, and, as before, having an outer region 92 adjacent to the cutting edge and abruptly rising inner region 94 defining the central island area 96. Due to the fact that the several sides of the insert of FIGURES 15 and 16 are relatively short, it becomes possible to form the outer region 92 of the recess as a portion of a single sphere having a center located on a perpendicular erected to the center of the pertaining face of the insert.

All of the inserts so far described have been of the two sided invertible type. The inserts are adapted for being inverted because each thereof has a substantial island area in the center of each face of the insert, which can be maintained large because the radii of the spheres and cylinders forming the outer regions of the recesses are relatively large. Since these radii are relatively large, the peripheral groove is somewhat shallow, and the abrupt rise forming the inner region of the recess terminates a substantial distance outwardly from the center of the pertaining face of the recess and this leaves an island area of substantial size. The utilization of a relatively large radius for the spheres and cylinders forming the outer region of the peripheral recess also maintains the angle between the outer region of the recess and the peripheral wall of the insert at a relatively small value. This angle, for the inserts of FIGURES 4 through 16 is on the order of about 10 degrees. The angle of the relatively abrupt rise, with respect to the outer region of the recess of the insert is on the order of about 100 to 120 degrees. For inserts, accordingly to FIGURES 4 thru 16, the lateral extent of the outer region of the recesses therein may be from about .040 to about .100 inch. The lateral extent of the inner region is correspondingly shorter and, as mentioned, an island area of substantial size is thereby provided so that insert can find adequate support as a flat shim or anvil.

The present invention is also adapted for being practiced in respect of inserts which are made one sided because they are not adapted for being supported as a flat shim or anvil. Such inserts as shown in FIGURES 17 through 24. These inserts are constructed in the same way as has already been described for the inserts of FIGURES 4 through 16 except that the radii of the spheres and cylinders forming the outer regions of the recesses are selected so small that the island area resulting, after the formation of the inner region of the recesses is, necessarily, too small to provide reliable support for the inserts in the tool holder on a flat shim or anvil. These inserts are thus usually made so as to have cutting edges formed on one side only thereof. It will be understood that shaped shims or anvils could be provided so inserts of this nature could be made two sided if desired and this is contemplated, especially where the cut to be taken by the insert is fairly light.

The insert of FIGURES 17 and 18 is square and has a recess 102 with an outer spherical region 104 and an abruptly rising inner region 106. The angle outer region 104 makes with peripheral surface 108 of the insert is on the order of from about 20 to 30 degrees. The lateral extent of outer region for chip direction, the island area 110 becomes too small to support the insert and it is, accordingly, as shown, made one sided, for normal use with a flat shim or anvil.

FIGURES 19 and 20 show a one sided triangular insert 112 with a groove 114. The outer region or portion 116 of the groove is cylindrical along each edge with the cylindrical curves blended at the corners of the insert by small radii. The outer region 116 of the groove makes an angle of from about 20 to 30 degrees with the peripheral wall 118 of the insert. The inner region 120 is inclined at an angle of about 110 degrees to the outer region and, as in connection with the insert of FIGURES 17 and 18, this results in an island area so small that the insert is made one sided.

FIGURES 21 and 22 show a one sided rhombus shaped insert 122 having a peripheral wall 124 and a recess 126 made up of a cylindrical outer region 128 which forms an angle of about 20 to 30 degrees with peripheral wall 124. Abruptly rising inner region 130, of the recess makes an angle of about 125 degrees with the outer region and thus defines a small island area 132.

FIGURES 23 and 24 show a modified one sided triangular or trigon insert 134 which, similar to its two sided counterpart of FIGURES 15 and 16, has outer region 138 of its recess 136 formed as part of a single sphere. Region 138 makes an angle of from about 20 to 30 degrees with pheripheral wall 140 of the insert. Inner region 142 of recess 136 rises from the bottom of the outer region 138 at an angle of about 115 degrees thereto and defines a small island area 143.

Figure 25:
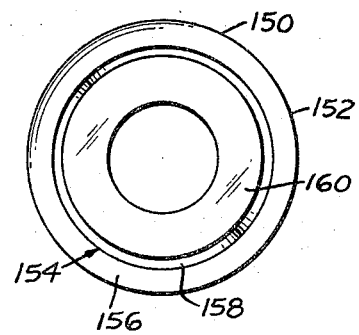
FIGURES 25 and 26 are plan and side views respectively of a two sided circular insert; and, FIGURES 27 and 28 are plan and side views respectively of a one sided circular insert.
Figure 26:
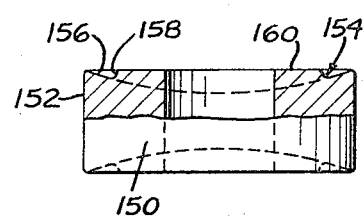

FIGURES 25 and 26 show a circular insert 150 having a pheripheral wall 152 and a recess 154 comprising an outer region 156, which is a portion of a single sphere and an abruptly rising inner region 158 which defines an island area 160. In FIGURES 25 and 26 the radius of the sphere is large and the island area is also large and the insert is two sided.

Figure 27:
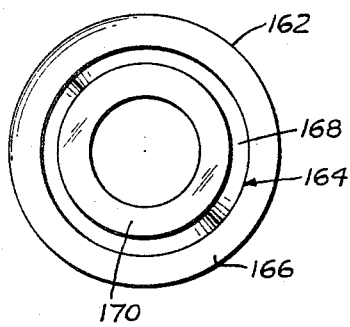
Figure 28:
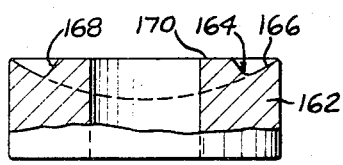

In FIGURES 27 and 28, another circular insert 162 is shown which is one sided because the radius of the sphere defining the outer portion 166 of the recess 164 is small and the abruptly rising inner region 168 of the recess defines only a small island area 170.

As to what is meant by "small" and "large" radii of curvature for the concave outer region of the recesses of the inserts, a two sided square insert which is one half inch on a side might employ as a "large" radius of curvature for the outer region of the insert, a radius of one and one half inches. A square one sided insert of the same size might, on the other hand employ a spherical radius of only about five-eighths to eleven-sixteenths inch.

A tringular insert having its sides tangent to a circle of one-half inch diameter might use a radius of about two and one-quarter inches as a "large" radius of curvature for the outer cylindrical region of the recess, and a radius of about five-eighths inch to one inch or more as a "small" radius of curvature.

The foregoing examples are, of course, illustrations and are not intended to be limiting.

An advantage gained by the practice of the present invention is that of a substantial reduction in the tendency of the insert to take chips of indeterminate length from a workpiece. The chips taken by an insert according to the present invention are somewhat curved in cross section and thus, for certain materials, tend to break more readily when deflected at the inner region of the recess of the insert than chips which are more or less rectangular in cross section such as are taken by more conventional inserts. The curved cross section of the chips comes about because of the curved recess means together with the curved-cutting edge.

The inserts according to the present invention can be formed to close tolerances by conventional molding practices so as readily to be indexable and invertible and replaceable, all without disturbing the accuracy of the cut being taken. In making the inserts, because of the sharp angle at the cutting edge, the inserts are always honed, as in an abrasive bath, to give each cutting edge a smooth contour with a radius of about .001 inch or so.

It will be observed that, in every case, the abrupt rise forming the inner region of the recess is curved in the direction of the length of the portion of the groove means to which the back wall pertains, except in the case of the circular inserts. The curvature of the abruptly-rising back wall is important because it assists in controlling the chip taken and likewise insures that the groove means formed in the recess will both widen and deepen from each corner of the recess to a point midway between the next adjacent corners of the recess.

With the circular inserts this is not the case although it will be appreciated that the circular inserts, in accordance with the teachings of the present invention, present both positive back rake and positive side rake to the work when tilted downwardly in two directions toward the work.

What is claimed is:

1. A positive rake throw away cutting insert adapted for being mounted in a negative rake holder; said insert comprising a body of hard material having opposed top and bottom faces in parallel planes and a peripheral surface perpendicular to said planes at least one of said faces having recess means formed therein along the entire outer edge thereof extending from the juncture of said peripheral surface and said one face inwardly toward the center of said one face, said recess comprising of an outer region adjacent said peripheral surface forming an angle less than 90° with said peripheral surface, said recess means also comprising an inner region in the form of an abrupt rise leading from the lowermost part of said outer region upwardly to the plane of said one face, the line of intersection of said inner region with the plane of said one face defining an island area in the cenetr of said one face, said outer region being concave toward said one face in cross section whereby when said insert is mounted in a negative rake holder and presented to a workpiece to be cut thereby and tilted downwardly relative thereto in two angularly related directions, the insert will present a positive rake to the workpiece in each of said directions.

2. A cutting insert according to claim 1 in which said outer region of said recess is smoothly curved.

3. A cutting insert according to claim 2 in which the curve of said outer region is in the form of cylindrical curvature.

4. A cutting insert according to claim 2 in which the curve of said outer region is in the form of spherical curvature.

5. A cutting insert according to claim 2 in which the faces of said insert are polygonal and have at least two planes of symmetry which are angularly related to each other and pass through the center of the insert.

6. A cutting insert according to claim 2 in which each face of the insert has a said recess means and a said island area.

7. A cutting insert according to claim 2 in which only one face of the insert has a said recess means and a said island area and the other face thereof is flat and smooth.

8. A cutting insert according to claim 2 in which the faces of said insert are circular.

9. A cutting insert according to claim 2 in which at least spaced points along the edge formed by the juncture of said outer region of said recess means with said peripheral surface are disposed in the plane of the face of the insert pertaining to said recess means.

10. A cutting insert according to claim 2 in which the angle formed between said peripheral surface and said outer region of said recess means is on the order of from 15 to 30 degrees.

11. A cutting insert according to claim 10 in which the angle formed between said inner and outer regions of said recess means is on the order of about 100 to 120 degrees.

12. A cutting insert according to claim 5 in which said recess means increases in width and depth from each corner of the insert toward a point midway to the next adjacent corner of the insert.

13. A cutting insert according to claim 2 in which said abruptly-rising inner region is curved so that to be concave in a direction upwardly from the center of the inserts.

14. A cutting insert according to claim 5 in which said abruptly-rising inner region is curved so as to be concave in a direction upwardly from the center of the insert.

References Cited

UNITED STATES PATENTS 2,870,523   1/1959   Richards _____ 29—96

FOREIGN PATENTS 1,136,185   9/1962   Germany.

HARRISON L. HINSON, *Primary Examiner.*

UNITED STATES PATENT OFFICE
CERTIFICATE OF CORRECTION

PATENT NO. : 3,399,442
DATED : September 3, 1968
INVENTOR(S) : Dennis G. Jones and George E. Greubel It is certified that error appears in the above-identified patent and that said Letters Patent are hereby corrected as shown below:

IN THE SPECIFICATION:

Column 7, line 32, after "and" add ---a perpendicular to---.

Column 7, line 35, withdraw "10" and replace by ---80---.

Column 7, line 67, withdraw "20 to 30" and replace by ---60 to 70---.

Column 8, line 2, withdraw "20 to 30" and replace by ---60 to 70---.

Column 8, line 11, withdraw "20 to 30" and replace by ---60 to 70---.

Column 8, lines 19 and 20, withdraw "20 to 30" and replace by ---60 to 70---.

IN THE CLAIMS:

Column 10, line 21, withdraw "15 to 30" and replace by ---60 to 75---.

Signed and Sealed this thirtieth Day of September 1975

[SEAL]

Attest:

RUTH C. MASON
*Attesting Officer*

C. MARSHALL DANN
*Commissioner of Patents and Trademarks*